United States Patent
Zhao et al.

(10) Patent No.: US 12,466,013 B2
(45) Date of Patent: Nov. 11, 2025

(54) DELIVERY APPARATUS AND AUTOMATED ASSEMBLY LINE

(71) Applicant: CONTEMPORARY AMPEREX TECHNOLOGY (HONG KONG) LIMITED, Hong Kong (CN)

(72) Inventors: Xinglong Zhao, Fujian (CN); Haihui Que, Fujian (CN); Lei Song, Fujian (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 287 days.

(21) Appl. No.: 18/217,614

(22) Filed: Jul. 3, 2023

(65) Prior Publication Data

US 2024/0165756 A1    May 23, 2024

Related U.S. Application Data

(63) Continuation of application No. PCT/CN2023/084451, filed on Mar. 28, 2023.

(30) Foreign Application Priority Data

Nov. 22, 2022  (CN) .......................... 202223104271.0

(51) Int. Cl.
   *B23Q 1/58*     (2006.01)
   *B23Q 5/38*     (2006.01)

(52) U.S. Cl.
   CPC .............. *B23Q 1/58* (2013.01); *B23Q 5/385* (2013.01)

(58) Field of Classification Search
   CPC ... B23Q 1/58; B23Q 3/385; B61J 1/10; B65G 47/82; B65G 47/8823
   See application file for complete search history.

(56) References Cited

U.S. PATENT DOCUMENTS

| 4,459,078 A | * | 7/1984 | Chiantella | ............ | B65G 1/0414 414/284 |
| 4,972,936 A | * | 11/1990 | Kura | ........................ | B23Q 7/08 198/465.1 |

(Continued)

FOREIGN PATENT DOCUMENTS

| CN | 109305551 A | 2/2019 |
| CN | 110172936 A | 8/2019 |

(Continued)

OTHER PUBLICATIONS

International Search Report issued Jul. 24, 2023 in international Patent Application No. PCT/CN2023/084451 with English translation thereof.

(Continued)

*Primary Examiner* — Saul Rodriguez
*Assistant Examiner* — Brendan P Tighe
(74) *Attorney, Agent, or Firm* — XSENSUS LLP

(57) ABSTRACT

This application relates to a delivery apparatus and an automated assembly line. The delivery apparatus may include: a delivery assembly including a delivery guide rail and a delivery tool, where the delivery tool may be slidably disposed on the delivery guide rail; a docking assembly including a docking drive structure and a docking guide rail, where the docking drive structure may be configured to drive the docking guide rail to move relative to the delivery guide rail so that the docking guide rail is able to dock with the delivery guide rail; and a blocking assembly configured to block the delivery tool on the delivery guide rail before the docking guide rail docks with the delivery guide rail for receiving the delivery tool.

15 Claims, 4 Drawing Sheets

(56) References Cited

U.S. PATENT DOCUMENTS

| | | | | |
|---|---|---|---|---|
| 5,054,986 A | * | 10/1991 | Hirano | B65G 1/04 |
| | | | | 414/284 |
| 6,149,366 A | * | 11/2000 | Deandrea | B65G 1/0414 |
| | | | | 414/279 |
| 6,561,338 B2 | * | 5/2003 | Ito | B65G 37/02 |
| | | | | 198/465.1 |
| 9,630,634 B2 | * | 4/2017 | Nakamura | B61J 1/00 |
| 10,207,867 B2 | * | 2/2019 | Brumm | B65G 1/02 |
| 2005/0103222 A1 | * | 5/2005 | Franke | B65G 63/004 |
| | | | | 104/281 |
| 2014/0008179 A1 | | 1/2014 | Matsumoto | |
| 2015/0034480 A1 | * | 2/2015 | Iou | C25D 17/06 |
| | | | | 204/297.08 |

FOREIGN PATENT DOCUMENTS

| | | | |
|---|---|---|---|
| CN | 213170247 U | | 5/2021 |
| CN | 215755073 U | | 2/2022 |
| CN | 216334728 U | | 4/2022 |
| CN | 218538342 U | | 2/2023 |
| JP | H04243727 A | * | 8/1992 |
| WO | 2020/126391 A1 | | 6/2020 |

OTHER PUBLICATIONS

Extended European Search Report issued Jul. 30, 2024 in European Patent Application No. 23734893.3.

* cited by examiner

DELIVERY APPARATUS AND AUTOMATED ASSEMBLY LINE

CROSS-REFERENCE TO RELATED APPLICATIONS

This application is a continuation of International Application No. PCT/CN2023/084451, filed Mar. 28, 2023, which claims priority to Chinese Patent Application No. 202223104271.0, filed on Nov. 22, 2022 and entitled "DELIVERY APPARATUS AND AUTOMATED ASSEMBLY LINE", each of which is incorporated herein by reference in its entirety.

TECHNICAL FIELD

This application relates to the technical field of assembly line operation, and in particular, to a delivery apparatus and an automated assembly line.

BACKGROUND

In an automated assembly line, transfer of a delivery tool on a delivery guide rail by a docking means is typically implemented in a manner of a control system controlling, according to a control program set therein, a drive motor to drive a docking guide rail to dock with the delivery guide rail. However, when the control program is flawed, the drive motor may fail and have positioning errors, resulting in inaccurate docking between the docking guide rail and the delivery guide rail. In this case, before docking between the docking guide rail and the delivery guide rail is in place, the delivery tool may run out of the delivery guide rail and derail, causing a safety incident.

SUMMARY

In view of the foregoing problem, this application provides a delivery apparatus and an automated assembly line, so as to reduce the risk of derailment of a delivery tool, thus improving safety during docking between a docking guide rail and a delivery guide rail.

According to a first aspect, this application provides a delivery apparatus including:

- a delivery assembly including a delivery guide rail and a delivery tool, where the delivery tool is slidably disposed on the delivery guide rail;
- a docking assembly including a docking drive member or structure and a docking guide rail, where the docking drive member is configured to drive the docking guide rail to move relative to the delivery guide rail so that the docking guide rail is able to dock with the delivery guide rail; and
- a blocking assembly configured to block the delivery tool on the delivery guide rail before the docking guide rail docks with the delivery guide rail for receiving the delivery tool.

In this application, before the docking guide rail docks with the delivery guide rail for receiving the delivery tool, the blocking assembly can block the delivery tool on the delivery guide rail, thus reducing the risk of the delivery tool running out of the delivery guide rail and derailing, and improving safety during docking between the docking guide rail and the delivery guide rail.

In an embodiment, the blocking assembly includes a base and a blocking member or structure, the blocking member being movably connected to the base.

The blocking member has a non-blocking position and a blocking position for blocking the delivery tool, and the blocking member moves relative to the base and is capable of switching between the blocking position and the non-blocking position.

When the docking guide rail has not docked with the delivery guide rail or received the delivery tool, the blocking member is in the blocking position; and when the docking guide rail has docked with the delivery guide rail but not received the delivery tool, the blocking member is in the non-blocking position.

Before the docking guide rail docks with the delivery guide rail at an end position, the blocking member is in the blocking position to block the delivery tool on the delivery guide rail. After the docking guide rail docks with the delivery guide rail at the end position, the blocking member is in the non-blocking position so that the delivery tool can move onto the docking guide rail under the action of a delivery drive member, thereby improving reliability and safety of the docking.

In an embodiment, the blocking member includes a rod and a buffer portion, one end of the rod being movably connected to the base, and the buffer portion being disposed at an end of the rod away from the base; and when the blocking member is in the blocking position, the buffer portion is used to block the delivery tool.

With the buffer portion provided, the buffer portion can absorb an impact force generated when the buffer portion collides with the delivery tool, thus reducing damage to the delivery tool and the rod, and helping to prolong service life of the delivery tool and blocking member.

In an embodiment, the blocking member is rotatably connected to the base; and the blocking member rotates relative to the base and switches between the blocking position and the non-blocking position.

The blocking member implements position switching in a rotation manner. As compared with a horizontal movement manner, volume required by the blocking member during position switching in the rotation manner is smaller than that required by horizontal movement, which helps to improve compactness of the structure of the delivery apparatus.

In an embodiment, the blocking assembly further includes a support member or supporter, the support member being in fit connection with the base and configured to support the blocking member when the blocking member rotates to the blocking position.

With the support member provided, on one hand, when the blocking member has rotated forward to the blocking position, the support member prevents the blocking member from continuing to rotate so that the blocking member can stop in the blocking position and block the delivery tool; and on the other hand, the support member can also stably support the blocking member in the blocking position, thus helping to improve stability of blocking by the blocking member.

In an embodiment, the support member has a support body and a telescopic portion in fit connection with the support body, the blocking member has a plurality of different blocking positions, and the telescopic portion stretches out and back relative to the support body to support the blocking member in the different blocking positions.

By adjusting length of the support member stretching out and back, the support member can support the blocking member in the different blocking positions so that the blocking member can be stably supported at an appropriate blocking position and have a large overlapping area with a positive projection of the delivery tool in a first direction.

In an embodiment, the docking assembly further includes a push member or pusher disposed on the docking guide rail.

The docking guide rail has a docking position for docking with the delivery guide rail and a non-docking position for non-docking with the delivery guide rail, and the docking guide rail moves relative to the delivery guide rail to switch between the docking position and the non-docking position.

During movement of the docking guide rail from the non-docking position to the docking position, the push member pushes the blocking member to move from the blocking position to the non-blocking position.

Therefore, in this application, the push member is a mechanical push member, and the push member can automatically push away the blocking member during movement of the docking guide rail relative to the delivery guide rail so that the docking guide rail can dock with the delivery guide rail. Such manner features simple and convenient operation, and the push member itself is not an electronically controlled part so that the push member itself is less influenced by a control program, thus helping to improve reliability of the blocking member switching from the blocking position to the non-blocking position.

In an embodiment, the delivery guide rail extends along a first direction, a width direction of the delivery guide rail is a second direction intersecting with the first direction, and the push member has a push slope, the push slope having a height difference in a third direction intersecting with the first direction X and the second direction, and the push slope being configured to push the blocking member to move horizontally or rotate.

With the push slope provided, the blocking member can be pushed by the push slope regardless of whether the blocking member moves horizontally or rotates relative to the base, thus improving reliability of position switching of the blocking member and facilitating more diverse connection manners between the blocking member and the base.

In an embodiment, the blocking member includes a rod and a rolling portion disposed on the rod, the push slope is in rolling connection with the rolling portion, and the push slope pushes the rolling portion to drive the rod to rotate.

Provision of the rolling portion leads to small friction between the rolling portion and the push slope, thus reducing wear between the push slope and the blocking member and helping to prolong service life of the delivery apparatus.

In an embodiment, the blocking assembly further includes a reset member or structure, the reset member being connected between the base and the blocking member and configured to provide a driving force for driving the blocking member to move from the non-blocking position to the blocking position.

The reset member is a mechanical member. Provision of the reset member can implement automatic reset of the blocking member, and the reset member is not influenced by a control program. This can reduce a failure rate of reset, helping to improve reliability and safety of blocking by the blocking member.

In an embodiment, the docking assembly further includes a stopping member or structure disposed on the docking guide rail, the stopping member being constructed to stop the delivery tool that has been delivered onto the docking guide rail on the docking guide rail.

The stopping member is disposed on the docking guide rail and is located at an end of the docking guide rail away from the delivery guide rail in the first direction to prevent the delivery tool from derailing from the end of the docking guide rail away from the delivery guide rail under the action of a delivery drive member or structure, thereby guaranteeing reliability of docking by the docking guide rail.

In an embodiment, the docking assembly further includes a sliding rail, and the docking drive member is constructed to drive the docking guide rail to slide relative to the delivery guide rail along an extension direction of the sliding rail.

Provision of the sliding rail can effectively improve stability of sliding of the docking guide rail.

In an embodiment, the delivery assembly and the blocking assembly are both provided in at least two and are in one-to-one correspondence, each delivery guide rail extends along a first direction, all the delivery assemblies are arranged in sequence along a second direction, the docking assembly is provided in two arranged along the first direction on two opposite sides of each delivery assembly, the docking guide rail in each docking assembly reciprocates along the second direction to dock with the delivery guide rail in any one of the delivery assemblies;

where a width direction of the delivery guide rail is the second direction intersecting with the first direction.

Therefore, it can be seen that the delivery assembly and the blocking assembly are both provided in at least two and are in one-to-one correspondence, and provision of two delivery assemblies can make multiple delivery assemblies operate reliably and stably at the same time, effectively improving work efficiency of the delivery apparatus.

In an embodiment, the delivery apparatus further includes a pedestal, and the delivery assembly, the docking assembly, and the blocking assembly are all in fit connection with the pedestal.

With the pedestal provided, the delivery assembly, the docking assembly, and the blocking assembly can be connected as a whole via the pedestal, facilitating more convenient mounting and use.

According to a second aspect, this application provides an automated assembly line including the delivery apparatus according to any one of the foregoing embodiments.

The foregoing description is merely an overview of the technical solution of this application. For a better understanding of the technical means in this application such that they can be implemented according to the content of the specification, and to make the above and other objectives, features and advantages of this application more obvious and easier to understand, the following describes specific embodiments of this application.

BRIEF DESCRIPTION OF DRAWINGS

To describe the technical solutions of the embodiments of this application more clearly, the following briefly describes the accompanying drawings required for describing the embodiments of this application. Apparently, the accompanying drawings in the following descriptions show merely some embodiments of this application, and persons of ordinary skill in the art may still derive other drawings from the accompanying drawings without creative efforts. In the accompanying drawings.

Figure 1:
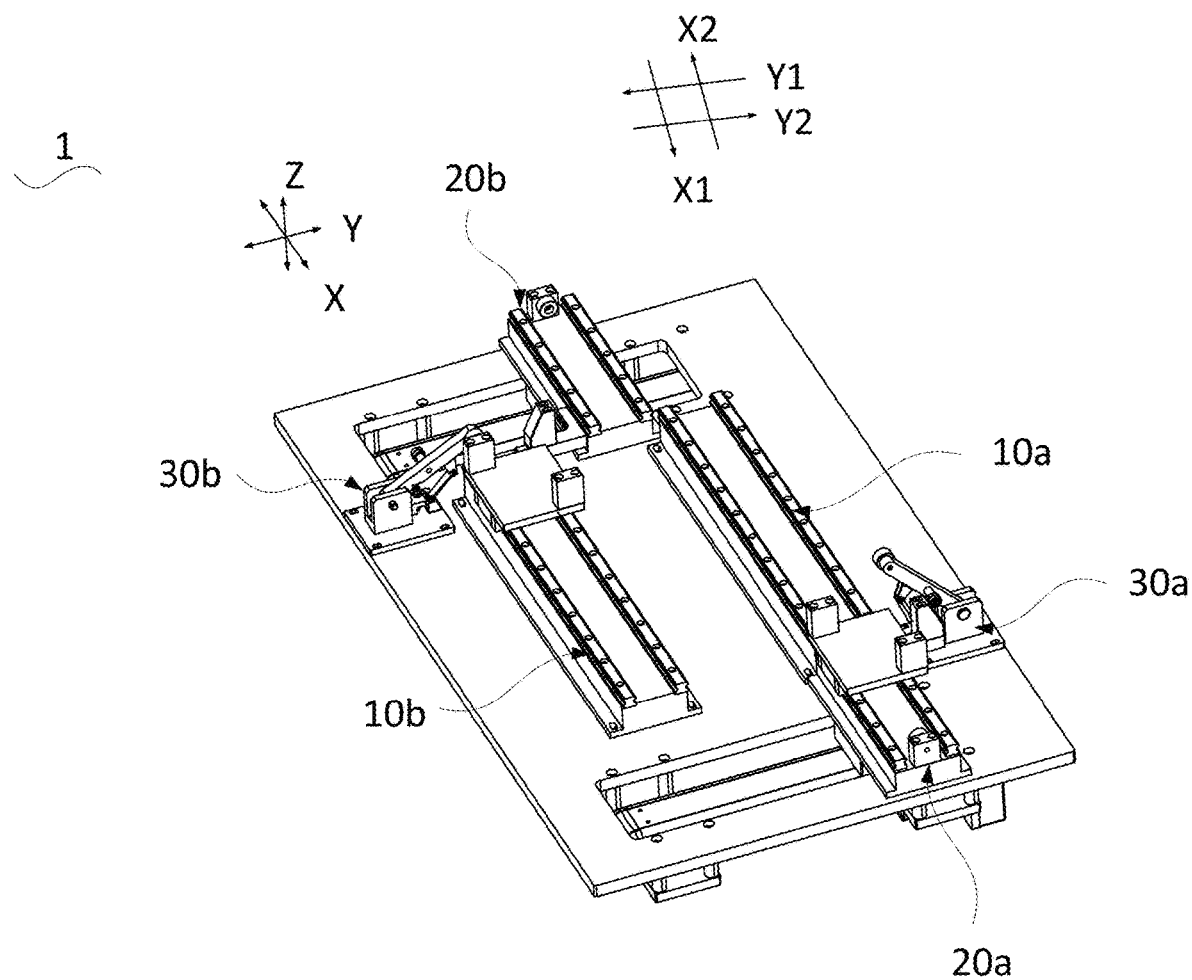
FIG. 1 is a schematic diagram of an overall structure of a delivery apparatus according to some embodiments of this application.

REFERENCE SIGNS 1. delivery apparatus; 10. delivery assembly; 10a. first delivery assembly; 10b. second delivery assembly; 11. delivery guide rail; 12. delivery tool; 20. docking assembly; 20a. first docking assembly; 20b. second docking assembly; 21. docking drive member; 22. docking guide rail; 23. push member; 231. push slope; 24. stopping member; 25. sliding rail; 30. blocking assembly; 30a. first blocking assembly; 30b. second blocking assembly; 31. base; 32. blocking member; 321. rod; 322. buffer portion; 323. rolling portion; 33. support member; 34. reset member; 40. pedestal; and 41. avoidance hole.

DESCRIPTION OF EMBODIMENTS

To make the above objectives, features, and advantages of this application more obvious and easier to understand, the following describes the specific embodiments of this application in detail with reference to the accompanying drawings. In the following description, many specific details are set forth to provide a thorough understanding of this application. However, this application can be implemented in many other ways different from those described herein, and those skilled in the art can make similar improvements without violating the connotation of this application. Therefore, this application is not limited by the specific embodiments disclosed below.

In the description of the embodiments of this application, the orientations or positional relationships indicated by the technical terms "center", "longitudinal", "transverse", "length", "width", "thickness", "upper", "lower", "front", "rear", "left", "right", "vertical", "horizontal", "top", "bottom", "inside", "outside", "clockwise", "counterclockwise", "axial", "radial", "circumferential", and the like are based on the orientations or positional relationships as shown in the accompanying drawings. These terms are merely for the ease and brevity of description of the embodiments of this application rather than indicating or implying that the apparatuses or components mentioned must have specific orientations or must be constructed or manipulated according to specific orientations, and therefore shall not be construed as any limitations on the embodiments of this application.

In addition, the terms "first" and "second" are merely for the purpose of description and shall not be understood as any indication or implication of relative importance or any implicit indication of the number of the technical features indicated. Therefore, a feature limited by the term "first", "second", or the like can explicitly or implicitly include one or more such features. In the description of this application, "a plurality of" means at least two, for example, two or three, unless otherwise specifically stated.

In this application, unless otherwise specified and defined explicitly, the terms "mount", "connect", "join", and "fasten" should be understood in their general senses. For example, they may refer to a fixed connection, a detachable connection, or an integral connection, may refer to a mechanical connection or electrical connection, and may refer to a direct connection, an indirect connection via an intermediate medium, or an interaction between two elements. Persons of ordinary skills in the art can understand specific meanings of these terms in this application as appropriate to specific situations.

In this application, unless otherwise clearly specified and limited, a first feature being "on" or "under" a second feature may mean that the first and second features are in direct contact, or the first and second features are in indirect contact through an intermediary. Further, the first feature being "on", "above", or "on top of" the second feature may mean that the first feature is directly above or obliquely above the second feature, or simply mean that the first feature is horizontally higher than the second feature. The first feature being "under", "below", or "beneath" the second feature may mean that the first feature is directly beneath or obliquely beneath the second feature, or simply mean that the first feature is horizontally lower than the second feature.

It should be noted that when an element is referred to as being "fastened to" or "disposed at" another element, it may be directly fastened to the another element, or there may be an element in between. When one element is assumed as being "connected to" another element, it may be connected to the another element directly or there may be an element in between. The terms "vertical", "horizontal", "upper", "lower", "left", "right", and other similar expressions as used herein are for illustration only, and are not intended to represent the only embodiment.

During automated assembly line production, it is necessary to use a delivery tool to drive a component under processing to be transported on a delivery guide rail in a current process, so that the component under processing can pass through a processing position on the delivery guide rail in the current process and be subject to processing of the current process. After the component under processing is processed in the current process, a docking guide rail docks with the delivery guide rail to transfer the delivery tool. For example, in some embodiments, the docking guide rail transfers the delivery tool carrying the component under processing that has been processed in the current process to a delivery guide rail for a next process, so that the component under processing on the delivery tool can be processed in the next process on the delivery guide rail for the next process. For another example, in some embodiments, the docking guide rail transfers an unloaded delivery tool to the delivery guide rail for the next process so that the delivery tool can receive, on the delivery guide rail for the next process, another component under processing that needs to be processed in the next process. For another example, in some embodiments, the docking guide rail retransfers an unloaded delivery tool to the delivery guide rail for the current process to continue receiving another component under processing that needs to be processed in the current process. The unloaded delivery tool is a delivery tool that carries no component under processing. When the component under processing on the delivery tool has been processed in the current process, the component under processing is taken out, and the delivery tool becomes an unloaded delivery tool.

For ease of description, an example in which after a component under processing has been processed in the current process, the component under processing is taken out of the delivery tool, and the delivery tool returns to the delivery guide rail for the current process with the help of the docking guide rail and is used to receive a next component under processing that needs to be processed in the current process is used for description in the following embodiments.

The delivery tool has an initial position, a processing position and an end position relative to the delivery guide rail for the current process, and the initial position, the processing position and the end position are spaced apart along an extension direction of the delivery guide rail for the current process. When the delivery tool is at the initial position, the delivery tool can be used to receive a component under processing delivered by the delivery guide rail for a previous process, and when the component under processing is fixed to the delivery tool, the delivery tool takes the component under processing to the processing position for processing. After the component under processing has been processed in the current process, the component under processing is taken out of the delivery tool, and then the delivery tool continues to move in an original direction. After the docking guide rail docks with the delivery guide rail for the current process, the delivery tool moves to the end position and is received by the docking guide rail, and the delivery tool can finally return to the initial position of the delivery guide rail for the current process under the action of the docking guide rail and be used to receive a next component under processing that needs to be processed in the current process.

A conventional automated assembly line is typically provided with a control system and a drive motor, and the control system controls, according to a control program set therein, the drive motor to drive a docking guide rail to dock with a delivery guide rail. When the control program is flawed, the drive motor may fail and have positioning errors, resulting in inaccurate docking between the docking guide rail and the delivery guide rail. In this case, before docking between the docking guide rail and the delivery guide rail is in place, the delivery tool may run out of the delivery guide rail and derail, causing a safety incident.

To reduce the risk of derailment of a delivery tool, the applicant has designed through intensive study a delivery apparatus that can be applied to an automated assembly line. The delivery apparatus can block the delivery tool on a delivery guide rail before a docking guide rail docks with the delivery guide rail for receiving the delivery tool. In this way, the risk of the delivery tool running out of the delivery guide rail and derailing before the docking guide rail docks with the delivery guide rail for receiving the delivery tool can be reduced, effectively improving safety during docking between the docking guide rail and the delivery guide rail.

Referring to FIG. 1, FIG. 1 is a schematic diagram of an overall structure of a delivery apparatus 1 according to some embodiments of this application. An automated assembly line disclosed in this application can be used to produce and process components under processing. The component under processing may be an energy-supplying component such as a battery cell or a battery, or a non-energy-supplying component such as a sensor or a valve.

Figure 2:
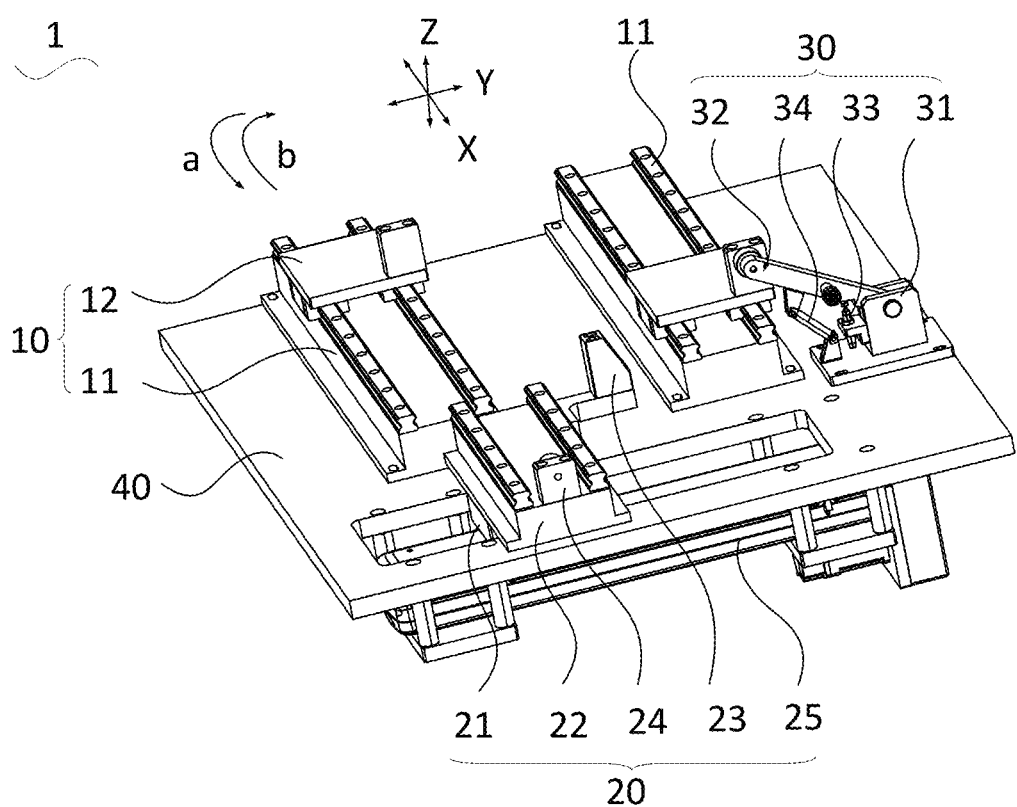
FIG. 2 is a schematic structural diagram of the delivery apparatus shown in FIG. 1 with a second docking assembly and a second blocking assembly removed and a docking guide rail in a first docking assembly not docking with a delivery guide rail in a first delivery assembly.
Figure 3:
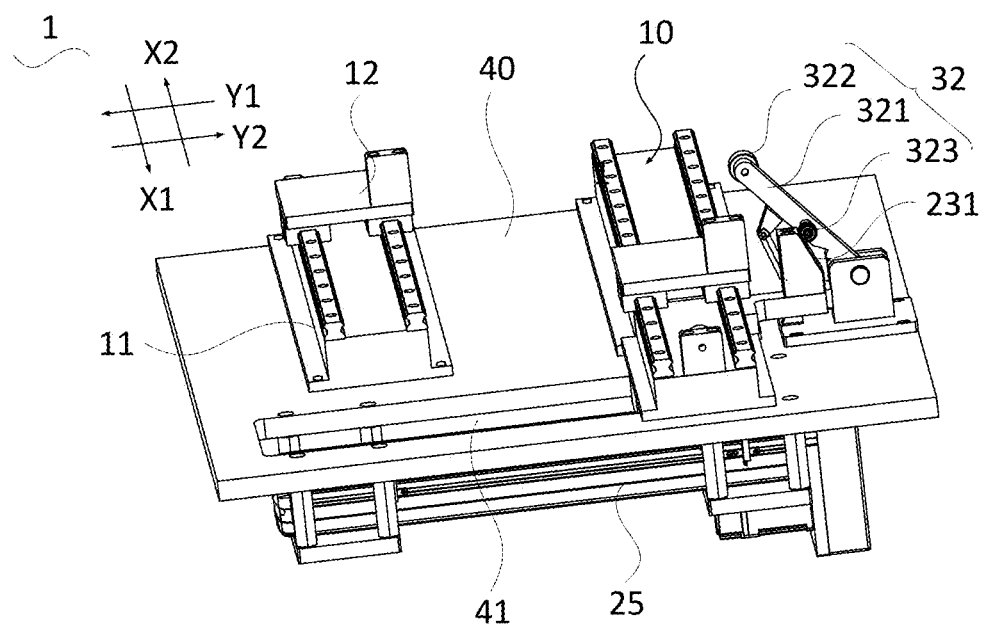
FIG. 3 is a schematic structural diagram of the delivery apparatus shown in FIG. 1 with the second docking assembly and the second blocking assembly removed and the docking guide rail in the first docking assembly docking with the delivery guide rail in the first delivery assembly.

Referring to FIG. 2 and FIG. 3, FIG. 2 is a schematic structural diagram of the delivery apparatus 1 shown in FIG. 1 with a docking guide rail 22 not docking with a delivery guide rail 11, and FIG. 3 is a schematic structural diagram of the delivery apparatus 1 shown in FIG. 1 with the docking guide rail 22 docking with the delivery guide rail 11. According to some embodiments of this application, this application provides an automated assembly line. The automated assembly line includes a delivery apparatus 1, and the delivery apparatus 1 includes a delivery assembly 10, a docking assembly 20, and a blocking assembly 30. The delivery assembly 10 includes a delivery guide rail 11 and a delivery tool 12, where the delivery tool 12 is slidably disposed on the delivery guide rail 11. The docking assembly 20 includes a docking drive member 21 and a docking guide rail 22, where the docking drive member 21 is configured to drive the docking guide rail 22 to move relative to the delivery guide rail 11 so that the docking guide rail 22 can dock with the delivery guide rail 11. The blocking assembly 30 is configured to block the delivery tool 12 on the delivery guide rail 11 before the docking guide rail 22 docks with the delivery guide rail 11 for receiving the delivery tool 12.

The delivery assembly 10, the docking assembly 20, and the blocking assembly 30 may all be mounted on the ground, a table, a pedestal 40 with a bearing surface, or the like, and may specifically be arranged as required.

The delivery assembly 10 further includes a delivery drive member, where the delivery drive member is in transmission connection with the delivery tool 12 and configured to drive the delivery tool 12 to slide on the delivery guide rail 11. The delivery guide rail 11 extends along a first direction X, and an initial position, a processing position, and an end position are provided in sequence along the extension direction of the delivery guide rail 11. The delivery tool 12 can pass through the initial position, the processing position, and the end position in sequence under the action of the delivery drive member. When the delivery tool 12 is in the initial position, the delivery tool 12 can be used to receive a component under processing from a previous process; when the delivery tool 12 is in the processing position, a component under processing carried on the delivery tool 12 can be processed in a current process; and when the delivery tool 12 is in the end position, the delivery tool 12 can be received by the docking guide rail 22.

The delivery drive member may be a telescopic cylinder, an electric telescopic rod, or another telescopic power source. The delivery tool 12 may be a structure having a clamping space for clamping a component under processing, or may be a structure capable of fitting with a part on a component under processing and fixing the component under processing (for example, the delivery tool 12 has a concave portion, and the component under processing has a convex portion fitting with the concave portion). The delivery tool 12 is also conventional in the art, so details are not described herein.

The docking drive member 21 is the above-mentioned drive motor. For example, the docking drive member 21 may be in transmission connection with only the delivery guide rail 11 and configured to drive the delivery guide rail 11 to drive the delivery tool 12 to move, so that the docking guide rail 22 can dock with the delivery guide rail 11. Alternatively, the docking drive member 21 may be in transmission connection with only the docking guide rail 22 and configured to drive the docking guide rail 22 to move, so that the docking guide rail 22 can dock with the delivery guide rail 11. Alternatively, the docking drive member 21 is in transmission connection with both the delivery guide rail 11 and the docking guide rail 22 and configured to synchronously drive the docking guide rail 22 and the delivery guide rail 11 to move, so as to implement docking between the docking guide rail 22 and the delivery guide rail 11. In this example, after the docking guide rail 22 docks with the delivery guide rail 11, the delivery tool 12 on the delivery guide rail 11 can be pushed onto the docking guide rail 22 under the action of the delivery drive member. The delivery guide rail 11 and/or docking guide rail 22 in transmission connection with the docking drive member 21 may move horizontally, oscillates, or move in another manner, which is specifically related to selection of the docking drive member 21.

For ease of description, an example in which the docking guide rail 22 extends along the first direction X and the docking drive member 21 drives the docking guide rail 22 to move horizontally along a second direction Y intersecting with the first direction X to implement docking with the delivery guide rail 11 is used for description in the following embodiments.

The blocking assembly 30 includes a blocking drive member and a blocking member 32, where the blocking drive member is in transmission connection with the blocking member 32 and configured to drive the blocking member 32 to block the delivery tool 12 on the delivery guide rail 11 before the docking guide rail 22 docks with the delivery guide rail 11. Specifically, the blocking drive member may drive the blocking member 32 to move horizontally, rotate, or move in another manner to implement blocking by the blocking member 32 for the delivery tool 12.

In some embodiments, the blocking drive member may be a mechanical drive member, and in some other embodiments, the blocking drive member may be an electronically controlled drive member. The mechanical drive member is a drive structure that can drive, without being energized, the blocking member 32 to move, and the electronically controlled drive member is a drive structure that can drive, only when being energized, the blocking member 32 to operate.

In actual operation, the delivery tool 12 is first located at the initial position, and after the delivery tool 12 receives a component under processing from a previous process, the delivery drive member drives the delivery tool 12 to drive the component under processing to slide on the delivery guide rail 11 to the processing position so that the component under processing can be processed. After processing is completed, an external transfer means (for example, a three-axis mechanical arm) takes the component under processing off, and the delivery drive member pushes the delivery tool 12 to continue moving along an original direction. Before the docking guide rail 22 docks with the delivery guide rail 11 at the end position, the blocking drive member drives the blocking member 32 to block the delivery tool 12 on the delivery guide rail 11. After the docking guide rail 22 docks with the delivery guide rail 11 at the end position, the blocking drive member drives the blocking member 32 to cancel blocking, and the delivery tool 12 moves onto the docking guide rail 22 under the action of the delivery drive member and is received by the docking guide rail 22. Then, the docking guide rail 22 docks with the delivery guide rail 11 at the initial position, and the delivery tool 12 can be pushed to the initial position under the action of the delivery drive member.

The docking guide rail 22 docking with the delivery guide rail 11 at the end position and the docking guide rail 22 docking with the delivery guide rail 11 at the initial position may be the same or different, which may specifically be configured as required.

For example, the docking assembly 20 and the delivery assembly 10 are both provided in one. The docking drive member 21 drives the docking guide rail 22 to dock with the delivery guide rail 11 at the end position to receive the delivery tool 12. Then, the docking drive member 21 drives the docking guide rail 22 to move and dock with the delivery guide rail 11 at the initial position so that the delivery tool 12 on the docking guide rail 22 can return to the initial position of the delivery guide rail 11 under the action of the delivery drive member.

For example, the docking assembly 20 is provided in two and the delivery assembly 10 is provided in one. The docking drive member 21 in a first docking assembly 20 drives the docking guide rail 22 in the same docking assembly 20 to dock with the delivery guide rail 11 at the end position to receive the delivery tool 12. Then, the docking drive member 21 in a second docking assembly 20 drives the docking guide rail 22 in the same docking assembly 20 to receive the delivery tool 12 on the docking guide rail 22 in the first docking assembly 20, and the docking guide rail 22 in the second docking assembly 20 moves and docks with the delivery guide rail 11 at the initial position so that the delivery tool 12 can return to the delivery guide rail 11.

In this application, before the docking guide rail 22 docks with the delivery guide rail 11 for receiving the delivery tool 12, the blocking assembly 30 can block the delivery tool 12 on the delivery guide rail 11, thus reducing the risk of the delivery tool 12 running out of the delivery guide rail 11 and derailing, and improving safety during docking between the docking guide rail 22 and the delivery guide rail 11.

In some embodiments of this application, the blocking assembly 30 includes a base 31 and a blocking member 32, the blocking member 32 being movably connected to the base 31. The blocking member 32 has a non-blocking position and a blocking position for blocking the delivery tool 12, and the blocking member 32 moves relative to the base 31 and is capable of switching between the blocking position and the non-blocking position. When the docking guide rail 22 has not docked with the delivery guide rail 11 or received the delivery tool, the blocking member 32 is in the blocking position; and when the docking guide rail 22 has docked with the delivery guide rail 11 but not received the delivery tool 12, the blocking member 32 is in the non-blocking position.

When the blocking member 32 is in the blocking position, the blocking member 32 at least partially overlaps with a positive projection of the delivery tool 12 in the first direction X, so as to block the delivery tool 12 when the delivery tool 12 is delivered on the delivery guide rail 11. When the blocking member 32 is in the non-blocking position, the blocking member 32 does not overlap with the positive projection of the delivery tool 12 in the first direction X, and the blocking member 32 cannot block the delivery tool 12.

Before the docking guide rail 22 docks with the delivery guide rail 11 at the end position, the blocking member 32 is in the blocking position to block the delivery tool 12 on the delivery guide rail 11. After the docking guide rail 22 docks with the delivery guide rail 11 at the end position, the blocking member 32 is in the non-blocking position so that the delivery tool 12 can move onto the docking guide rail 22 under the action of the delivery drive member, thereby improving reliability and safety of the docking.

In some embodiments of this application, the blocking member 32 includes a rod 321 and a buffer portion 322, one end of the rod 321 being movably connected to the base 31, and the buffer portion 322 being disposed at an end of the rod 321 away from the base 31; and when the blocking member 32 is in the blocking position, the buffer portion 322 is used to block the delivery tool 12.

The rod 321 may be made of alloy, plastic, wood, or another material. The rod 321 needs to have sufficient stiffness to support the buffer portion 322. The buffer portion 322 may be made of rubber, silicone, sponge, or another material. The buffer portion 322 may be connected to the rod 321 through clamping, bonding, magnetic adsorption, or another manner.

With the buffer portion 322 provided, the buffer portion 322 can absorb an impact force generated when the buffer portion 322 collides with the delivery tool 12, thus reducing damage to the delivery tool 12 and the rod 321, and helping to prolong service life of the delivery tool 12 and blocking member 32.

In some embodiments of this application, the blocking member 32 is rotatably connected to the base 31; and the blocking member 32 rotates relative to the base 31 and switches between the blocking position and the non-blocking position.

Specifically, one end of the rod 321 is rotatably connected to the base 31 via a structure such as a rotating shaft, a hinge, and a spherical pair.

The blocking member 32 is driven by the blocking drive member to rotate. The blocking member 32 rotates forward relative to the base 31 (for example, as shown in FIG. 2, in the direction indicated by arrow a) so that the blocking member 32 can switch from the non-blocking position to the blocking position, and the blocking member 32 rotates backward relative to the base 31 (for example, as shown in FIG. 2, in the direction indicated by arrow b) so that the blocking member 32 can switch from the blocking position to the non-blocking position.

The blocking member 32 implements position switching in a rotation manner. As compared with a horizontal movement manner, volume required by the blocking member 32 during position switching in the rotation manner is smaller than that required by horizontal movement, which helps to improve compactness of the structure of the delivery apparatus 1.

For ease of description, an example in which the blocking member 32 rotates relative to the base 31 to implement position switching is used for description in the following embodiments.

In some embodiments of this application, the blocking assembly 30 further includes a support member 33, the support member 33 being in fit connection with the base 31 and configured to support the blocking member 32 when the blocking member 32 rotates to the blocking position.

For example, the support member 33 may be a support platform, a support rod, a support base, or another structure.

The support member 33 may be fixed to the base 31 and always in a same position to support the blocking member 32. Alternatively, the support member 33 may be movably disposed on the base 31, and the support member 33 has non-support positions spaced apart along a third direction Z and support positions for supporting the blocking member 32, where the third direction Z intersects with both the first direction X and the second direction Y. Taking FIG. 2 as an example, the first direction X is a front-to-rear direction, the second direction Y is a left-to-right direction, and the third direction Z is an up-to-down direction. The support member 33 moves relative to the base 31 to switch between the non-support position and the support position. When the support member 33 is in the non-support position, the support member 33 cannot support the blocking member 32 regardless of whether the blocking member 32 is in the blocking position or not. When the support member 33 is in the support position, the support member 33 can support the blocking member 32 in the blocking position. When the blocking member 32 is in the non-blocking position, the support member 33 is in the non-support position, and when the blocking member 32 is in the blocking position, the support member 33 is in the support position.

With the support member 33 provided, on one hand, when the blocking member 32 has rotated forward to the blocking position, the support member 33 can prevent the blocking member 32 from continuing to rotate so that the blocking member 32 can stop at the blocking position and block the delivery tool 12; and on the other hand, the support member 33 can also stably support the blocking member 32 in the blocking position, thus helping to improve stability of blocking by the blocking member 32.

In some embodiments of this application, the support member 33 has a support body and a telescopic portion in fit connection with the support body, the blocking member 32 has a plurality of different blocking positions, and the telescopic portion stretches out and back relative to the support body to support the blocking member 32 in the different blocking positions.

Specifically, the telescopic portion stretches out and back relative to the support body along the third direction Z to support the blocking member 32 in the different blocking positions.

The support member 33 may be a hydraulic cylinder, the support body is a cylinder structure of the hydraulic cylinder, and the telescopic portion is a piston rod of the hydraulic cylinder. For another example, the support member 33 is an electric telescopic rod, the support body is a fixed part of the electric telescopic rod, and the telescopic portion is a telescopic rod part of the electric telescopic rod that can stretch out and back relative to the fixed part.

In actual operation, the blocking member 32 moves and can pass through multiple blocking positions. When the blocking member 32 is in the different blocking positions, overlapping areas of the blocking member 32 with the positive projection of the delivery tool 12 in the first direction X are different. Larger overlapping area of the blocking member 32 with the positive projection of the delivery tool 12 in the first direction X leads to better blocking effect of the blocking member 32; and smaller overlapping area of the blocking member 32 with the positive projection of the delivery tool 12 in the first direction X leads to worse blocking effect of the blocking member 32.

By adjusting length of the support member 33 stretching out and back, the support member 33 can support the blocking member 32 in the different blocking positions so that the blocking member 32 can be stably supported at an appropriate blocking position and have a large overlapping area with the positive projection of the delivery tool 12 in the first direction X.

Figure 4:
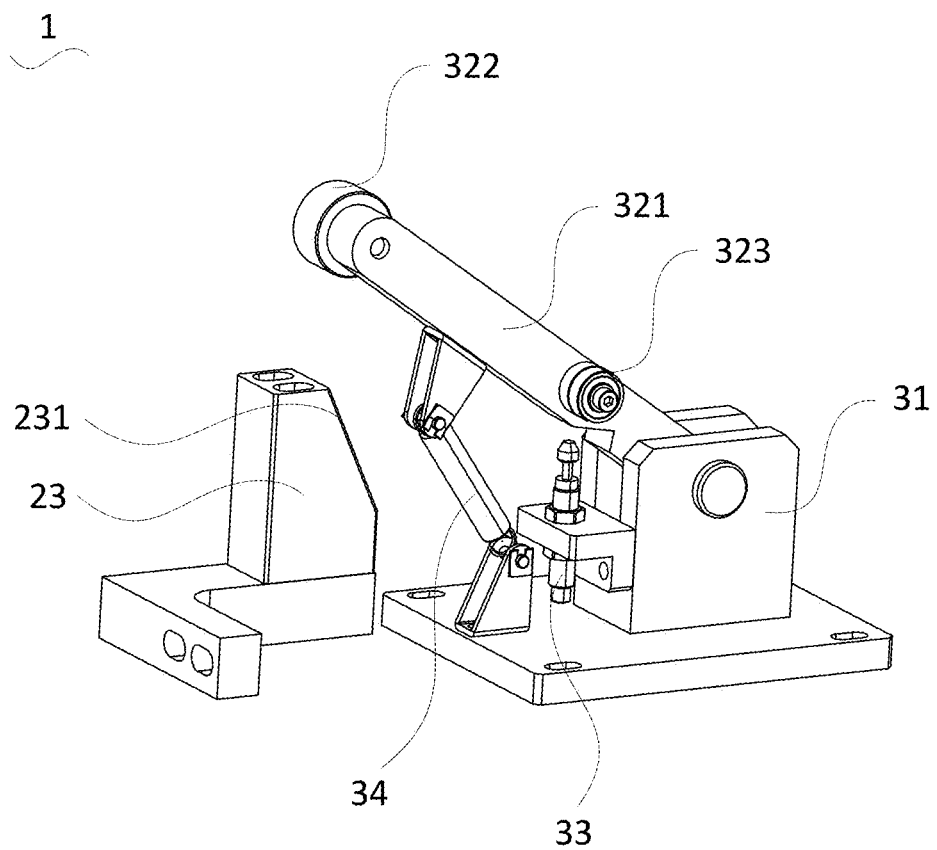
FIG. 4 is a schematic structural diagram of a push member in the first docking assembly fitting with a first blocking assembly in the delivery apparatus shown in FIG. 1.

Referring to FIG. 4, FIG. 4 is a schematic structural diagram of a push member 23 fitting with the blocking assembly 30 in the delivery apparatus 1 in this application. In some embodiments of this application, the docking assembly 20 further includes a push member 23 disposed on the docking guide rail 22. The docking guide rail 22 has a docking position for docking with the delivery guide rail 11 and a non-docking position for non-docking with the delivery guide rail 11, and the docking guide rail 22 moves relative to the delivery guide rail 11 to switch between the docking position and the non-docking position; and during movement of the docking guide rail 22 from the non-docking position to the docking position, the push member 23 pushes the blocking member 32 from the blocking position to the non-blocking position.

Specifically, before the docking guide rail 22 is in the non-docking position, the docking guide rail 22 does not dock with the delivery guide rail 11. In this case, although the push member 23 acts on the blocking member 32 and pushes the blocking member 32 to move, the blocking member 32 is always in the blocking position. When the docking guide rail 22 moves to the docking position, the push member 23 pushes the blocking member 32 to the non-blocking position so that the delivery tool 12 can slide onto the docking guide rail 22 under the action of the delivery drive member. Then, the docking guide rail 22 is separated from the delivery guide rail 11 under the action of the docking drive member 21 and gradually leaves the docking guide rail 22, and the blocking member 32 rotates reversely and returns to the blocking position to block a subsequent delivery tool 12 that returns to the delivery guide rail 11.

The push member 23 is fixed to the docking guide rail 22 and moves synchronously with the docking guide rail 22. The push member 23 is a part of the above-mentioned blocking drive member. In other words, in addition to the push member 23, the blocking drive member further includes other parts, which is specifically explained in subsequent descriptions.

Therefore, in this application, the push member 23 is a mechanical push member 23, and the push member 23 can automatically push away the blocking member 32 during movement of the docking guide rail 22 relative to the delivery guide rail 11 so that the docking guide rail 22 can dock with the delivery guide rail 11. Such manner features simple and convenient operation, and the push member 23 itself is not an electronically controlled part so that the push member 23 itself is less influenced by a control program and has low failure rate, thus helping to improve reliability of the blocking member 32 switching from the blocking position to the non-blocking position.

In some embodiments of this application, the delivery guide rail 11 extends along a first direction X, a width direction of the delivery guide rail 11 is a second direction Y intersecting with the first direction X, and the push member 23 has a push slope 231, the push slope 231 having a height difference in a third direction Z intersecting with the first direction X and the second direction Y, and the push slope 231 being configured to push the blocking member 32 to move horizontally or rotate.

The push slope 231 being used to push the blocking member 32 to move horizontally is used as an example, for which, the blocking position and the non-blocking position are also arranged along the second direction Y. For example, a blocking slope may be provided on the blocking member 32, where the push slope 231 and the blocking slope are parallel to and fit with each other. In the process of the docking assembly 20 moving along the second direction Y and approaching the delivery guide rail 11, the push slope 231 fits with the blocking slope and pushes the blocking member 32 to move along the second direction Y so that the blocking member 32 gradually approaches the non-blocking position from the blocking position. When the docking assembly 20 docks with the delivery guide rail 11, the blocking member 32 moves to the non-blocking position. After the docking guide rail 22 receives the delivery tool 12, the docking guide rail 22 moves along the second direction Y and leaves the delivery guide rail 11 so that the push slope 231 can be separated from the blocking slope. At this point, the blocking member 32 is no longer controlled by the push member 23 and returns to the blocking position.

The push slope 231 being used to push the blocking member 32 to rotate is used as an example, for which, in the process of the docking assembly 20 moving along the second direction Y and approaching the delivery guide rail 11, the push slope 231 pushes the blocking member 32 to rotate reversely so that the blocking member 32 gradually approaches the non-blocking position from the blocking position. When the docking assembly 20 docks with the delivery guide rail 11, the blocking member 32 rotates reversely to the non-blocking position. After the docking guide rail 22 receives the delivery tool 12, the docking guide rail 22 moves along the second direction Y and leaves the delivery guide rail 11 so that the push slope 231 can be separated from the blocking member 32. The blocking assembly 30 is no longer controlled by the push member 23 and returns to the blocking position to receive a next component under processing.

With the push slope 231 provided, the blocking member 32 can be pushed by the push slope 231 regardless of whether the blocking member 32 moves horizontally or rotates relative to the base 31, thus improving reliability of position switching of the blocking member 32 and facilitating more diverse connection manners between the blocking member 32 and the base 31.

In some embodiments of this application, the blocking member 32 includes a rod 321 and a rolling portion 323 disposed on the rod 321, the push slope 231 is in rolling connection with the rolling portion 323, and the push slope 231 pushes the rolling portion 323 to drive the rod 321 to rotate.

In other words, the rod 321 is rotatably connected to the base 31, and the push slope 231 pushes the rolling portion 323 to roll relative to the rod 321 to enable the blocking member 32 to switch from the blocking position to the non-blocking position.

The rolling portion 323 may be a roller, a ball, or in another form.

Provision of the rolling portion 323 leads to small friction between the rolling portion 323 and the push slope 231, thus reducing wear between the push slope 231 and the blocking member 32 and helping to prolong service life of the delivery apparatus 1.

In some embodiments of this application, the blocking assembly 30 further includes a reset member 34, the reset member 34 being connected between the base 31 and the blocking member 32 and configured to provide a driving force for driving the blocking member 32 to move from the non-blocking position to the blocking position.

The reset member 34 is combined with the push member 23 to together form the above-mentioned blocking drive member. In addition, two opposite ends of the reset member 34 are rotatably connected to the base 31 and the blocking member 32 respectively.

The reset member 34 is a spring. In the process of the push member 23 pushing the blocking member 32 to switch from the blocking position to the non-blocking position, the spring stretches and stores elastic potential energy. After receiving the delivery tool 12, the docking guide rail 22 leaves the delivery guide rail 11 along the second direction Y to separate the push member 23 from the blocking member 32. At this point, the spring releases the elastic potential energy so that the blocking rod can be reset to the blocking position for subsequent blocking.

The reset member 34 is a mechanical member. Provision of the reset member 34 can implement automatic reset of the blocking member 32, and the reset member 34 is not influenced by a control program. This can reduce a failure rate of reset, helping to improve reliability and safety of blocking by the blocking member 32.

In some embodiments of this application, the docking assembly 20 further includes a stopping member 24 disposed on the docking guide rail 22, the stopping member 24 being constructed to stop the delivery tool 12 that has been delivered onto the docking guide rail 22 on the docking guide rail 22.

The stopping member 24 may be a stopping block, a stopping plate, or another stopping structure.

The stopping member 24 is disposed on the docking guide rail 22 and is located at an end of the docking guide rail 22 away from the delivery guide rail 11 in the first direction X to prevent the delivery tool 12 from derailing from the end of the docking guide rail 22 away from the delivery guide rail 11 under the action of the delivery drive member, thereby guaranteeing reliability of docking by the docking guide rail 22.

In some embodiments of this application, the docking assembly 20 further includes a sliding rail 25, and the docking drive member 21 is constructed to drive the docking guide rail 22 to slide relative to the delivery guide rail 11 along an extension direction of the sliding rail 25. The sliding rail 25 extends along the second direction Y, and the docking guide rail 22 is slidably disposed on the sliding rail 25 and switches between the non-docking position and the docking position under the action of the docking drive member 21.

Provision of the sliding rail 25 can effectively improve stability of sliding of the docking guide rail 22.

Still referring to FIG. 1, FIG. 2, and FIG. 3, in some embodiments of this application, the delivery assembly 10 and the blocking assembly 30 are both provided in at least two and are in one-to-one correspondence, each delivery guide rail 11 extends along the first direction X, all the delivery assemblies 10 are arranged in sequence along the second direction Y, the docking assembly 20 is provided in two arranged along the first direction X on two opposite sides of each delivery assembly 10, and the docking guide rail 22 in each docking assembly 20 reciprocates along the second direction Y to dock with the delivery guide rail 11 in any one of the delivery assemblies 10.

A width direction of the delivery guide rail 11 is the second direction Y intersecting with the first direction X. When docking with the delivery guide rail 11 in any one of the delivery assemblies 10, the docking guide rail 22 that has not received the delivery tool 12 can receive the delivery tool 12 on this delivery guide rail 11. When docking with any delivery guide rail 11 in the remaining delivery assemblies 10, the docking guide rail 22 that has received the delivery tool 12 can make the delivery tool 12 on the docking guide rail 22 move onto this delivery guide rail 11.

Each blocking assembly 30 is disposed adjacent to the end position of its corresponding delivery assembly 10 and is used to block the delivery tool 12 in the corresponding delivery assembly 10.

The following describes in detail a specific operating process of the delivery apparatus 1 in these embodiments.

For example, the delivery assembly 10 and the docking assembly 20 are both provided in two. In FIG. 1, the delivery assembly 10 on the right side is defined as the first delivery assembly 10a, the delivery assembly 10 on the left side is defined as the second delivery assembly 10b, the blocking assembly 30 corresponding to the first delivery assembly 10a is the first blocking assembly 30a, and the blocking assembly 30 corresponding to the second delivery assembly 10b is the second blocking assembly 30b. The first blocking assembly 30a is disposed adjacent to the end position of the first delivery assembly 10a, and the second blocking assembly 30b is disposed adjacent to the end position of the second delivery assembly 10b. The initial position, processing position and end position on the delivery guide rail 11 in each first delivery assembly 10a are arranged along a first sub-direction X1 of the first direction X, and the initial position, processing position and end position on the delivery guide rail 11 in the second delivery assembly 10b are arranged along a second sub-direction X2 of the first direction X, where the first sub-direction X1 is opposite to the second sub-direction X2.

The second direction Y has a third sub-direction Y1 and a fourth sub-direction Y2 opposite to the third sub-direction Y1, where the third sub-direction Y1 is opposite to the fourth sub-direction Y2, the third sub-direction Y1 is a direction of the first delivery assembly 10a pointing toward the second delivery assembly 10b, and the fourth sub-direction Y2 is a direction of the second delivery assembly 10b pointing toward the first delivery assembly 10a.

The two docking assemblies 20 are arranged along the second sub-direction X2 on two opposite sides of each delivery assembly 10, and in the second sub-direction X2, the docking assembly 20 located upstream is the first docking assembly 20a, and the docking assembly 20 located downstream is the second docking assembly 20b.

In actual operation, the delivery tool 12 in the first delivery assembly 10a is first in the initial position of the delivery guide rail 11 in the first delivery assembly 10a and receives a component under processing delivered from a previous process. Then, under the action of the delivery drive member of the first delivery assembly 10a, the delivery tool 12 in the first delivery assembly 10a takes the received component under processing to the processing position for processing. After processing is completed, the component under processing is taken away, and the delivery tool 12 in the first delivery assembly 10a continues sliding under the action of the delivery drive member in the same delivery assembly 10 until the delivery tool 12 moves to the end position. It should be noted that before the delivery tool 12 in the first delivery assembly 10a reaches the end position, when the docking guide rail 22 in the first docking assembly 20a has not docked with the delivery guide rail 11 in the first delivery assembly 10a, the blocking member 32 in the first blocking assembly 30a is in the blocking position for blocking the delivery tool 12 in the first delivery assembly 10a. When the docking guide rail 22 in the first docking assembly 20a has docked with the delivery guide rail 11 in the first delivery assembly 10a, the blocking member 32 in the first blocking assembly 30a switches to the non-blocking position so that the delivery tool 12 in the first delivery assembly 10a can move onto the docking guide rail 22 in the first docking assembly 20a.

In this process, the delivery tool 12 in the second delivery assembly 10b passes in sequence, along the second sub-direction X2, through the initial position, processing position, and end position on the delivery guide rail 11 in the second delivery assembly 10b. Before the delivery tool 12 in the second delivery assembly 10b reaches the end position, when the docking guide rail 22 in the second docking assembly 20b has not docked with the delivery guide rail 11 in the second delivery assembly 10b, the blocking member 32 in the second blocking assembly 30b is in the blocking position for blocking the delivery tool 12 in the second delivery assembly 10b. When the docking guide rail 22 in the second docking assembly 20b has docked with the delivery guide rail 11 in the second delivery assembly 10b, the blocking member 32 in the second blocking assembly 30b switches to the non-blocking position so that the delivery tool 12 in the second delivery assembly 10b can move onto the docking guide rail 22 in the second docking assembly 20b.

Then, the docking drive member 21 in the first docking assembly 20a drives the docking guide rail 22 in the same docking assembly to move along the third sub-direction Y1 to enable the docking guide rail 22 in the first docking assembly 20a to dock with the delivery guide rail 11 in the second delivery assembly 10b. At the same time, the docking drive member 21 in the second docking assembly 20b drives the docking guide rail 22 in the same docking assembly to move along the fourth sub-direction Y2 to enable the docking guide rail 22 in the second docking assembly 20b to dock with the delivery guide rail 11 in the first delivery assembly 10a.

Then, under the action of the delivery drive member in the second delivery assembly 10b, the delivery tool 12 on the docking guide rail 22 in the first docking assembly 20a is pushed to the initial position of the delivery guide rail 11 in the second delivery assembly 10b; and under the action of the delivery drive member in the first delivery assembly 10a, the delivery tool 12 on the docking guide rail 22 in the second docking assembly 20b is pushed to the initial position of the delivery guide rail 11 in the first delivery assembly 10a. After this, a new cycle is started.

Therefore, it can be seen that the delivery assembly 10 and the blocking assembly 30 are both provided in at least two and are in one-to-one correspondence, and provision of two delivery assemblies 10 can make multiple delivery assemblies 10 operate reliably and stably at the same time, effectively improving efficiency of the delivery apparatus 1.

In some embodiments of this application, the delivery apparatus 1 further includes a pedestal 40, and the delivery assembly 10, the docking assembly 20, and the blocking assembly 30 are all in fit connection with the pedestal 40.

The pedestal 40 has a first surface and a second surface disposed in sequence along the third direction Z, and the pedestal 40 also has an avoidance hole 41 running through the first surface and the second surface in the third direction Z. The delivery assembly 10 and the blocking assembly 30 are in fit connection with the first surface, the docking guide rail 22 in the docking assembly 20 is slidably disposed on the first surface, and the docking drive member 21 is carried by the second surface and runs through the avoidance hole 41 to be in transmission connection with the docking guide rail 22.

The pedestal 40 and the base 31 may be integrally formed, or may be separately formed and connected by welding, bonding, or in another detachable manner.

With the pedestal 40 provided, the delivery assembly 10, the docking assembly 20, and the blocking assembly 30 can be connected as a whole via the pedestal 40, facilitating more convenient mounting and use.

This application further provides an automated assembly line including the delivery apparatus 1 according to any one of the foregoing embodiments.

According to some embodiments of this application, referring to FIG. 1 to FIG. 4, this application provides a delivery apparatus 1 including a delivery assembly 10, a docking assembly 20, and a blocking assembly 30. The delivery assembly 10 includes a delivery guide rail 11 and a delivery tool 12, where the delivery tool 12 is slidably disposed on the delivery guide rail 11. The docking assembly 20 includes a docking drive member 21 and a docking guide rail 22, where the docking drive member 21 is configured to drive the docking guide rail 22 to move relative to the delivery guide rail 11 so that the docking guide rail 22 can dock with the delivery guide rail 11. The blocking assembly 30 includes a base 31 and a blocking member 32, the blocking member 32 being movably connected to the base 31. The blocking member 32 has a non-blocking position and a blocking position for blocking the delivery tool 12, and the blocking member 32 moves relative to the base 31 and is capable of switching between the blocking position and the non-blocking position. When the docking guide rail 22 has not docked with the delivery guide rail 11 or received the delivery tool 12, the blocking member 32 is in the blocking position; and when the docking guide rail 22 has docked with the delivery guide rail 11 but not received the delivery tool 12, the blocking member 32 is in the non-blocking position.

In such delivery apparatus 1, before the docking guide rail 22 docks with the delivery guide rail 11 at an end position, the blocking member 32 is in the blocking position to block the delivery tool 12 on the delivery guide rail 11. After the docking guide rail 22 docks with the delivery guide rail 11 at the end position, the blocking member 32 is in the non-blocking position so that the delivery tool 12 can move onto the docking guide rail 22 under the action of a delivery drive member. In this way, the delivery tool 12 can be prevented from derailing before the docking guide rail 22 docks with the delivery guide rail 11, featuring better docking safety as well as better docking reliability.

Technical features in the foregoing embodiments may be combined in any way. For brevity of description, not all possible combinations of the technical features in the foregoing embodiments are described. However, as long as there is no contradiction among combinations of these technical features, all the combinations should be considered within a range recorded in this specification.

The foregoing embodiments only represent several implementations of this application, and descriptions thereof are specific and detailed, but should not be construed as a limitation on the scope of this patent. It should be noted that persons of ordinary skill in the art may further make several modifications and improvements without departing from the concept of this application, and all these modifications and improvements also fall within the protection scope of this application. Therefore, the protection scope of this application should be subject to the appended claims.

The invention claimed is:

1. A delivery apparatus, comprising:
a delivery assembly comprising a delivery guide rail and a delivery tool, wherein the delivery tool is slidably disposed on the delivery guide rail;
a docking assembly comprising a docking drive structure and a docking guide rail, wherein the docking drive structure is configured to drive the docking guide rail to move relative to the delivery guide rail so that the docking guide rail is able to dock with the delivery guide rail; and
a blocking assembly configured to block the delivery tool on the delivery guide rail before the docking guide rail docks with the delivery guide rail for receiving the delivery tool,
wherein the blocking assembly is configured to have a plurality of different blocking positions and is engageable with different portions of the delivery tool to block the delivery tool.

2. The delivery apparatus according to claim 1, wherein the blocking assembly comprises a base and a blocking structure, the blocking structure being movably connected to the base;
the blocking structure has a non-blocking position and a blocking position for blocking the delivery tool, and the blocking structure moves relative to the base and is capable of switching between the blocking position and the non-blocking position; and
when the docking guide rail has not docked with the delivery guide rail or received the delivery tool, the blocking structure is in the blocking position; and when the docking guide rail has docked with the delivery guide rail but not received the delivery tool, the blocking structure is in the non-blocking position.

3. The delivery apparatus according to claim 2, wherein the blocking structure comprises a rod and a buffer portion, one end of the rod being movably connected to the base, and the buffer portion being disposed at an end of the rod away from the base; and when the blocking structure is in the blocking position, the buffer portion is used to block the delivery tool.

4. The delivery apparatus according to claim 2, wherein the blocking structure is rotatably connected to the base; and the blocking structure rotates relative to the base and switches between the blocking position and the non-blocking position.

5. The delivery apparatus according to claim 4, wherein the blocking assembly further comprises a supporter, the supporter being in fit connection with the base and configured to support the blocking structure when the blocking structure rotates to the blocking position.

6. The delivery apparatus according to claim 5, wherein the supporter has a support body and a telescopic portion in fit connection with the support body, and the telescopic portion stretches out and back relative to the support body to support the blocking structure in the plurality of different blocking positions.

7. The delivery apparatus according to claim 2, wherein the docking assembly further comprises a pusher disposed on the docking guide rail;

the docking guide rail has a docking position for docking with the delivery guide rail and a non-docking position for non-docking with the delivery guide rail, and the docking guide rail moves relative to the delivery guide rail to switch between the docking position and the non-docking position; and during movement of the docking guide rail from the non-docking position to the docking position, the pusher pushes the blocking member from the blocking position to the non-blocking position.

8. The delivery apparatus according to claim 7, wherein the delivery guide rail extends along a first direction, a width direction of the delivery guide rail is a second direction intersecting with the first direction, and the pusher has a push slope, the push slope having a height difference in a third direction intersecting with the first direction and the second direction, and the push slope being configured to push the blocking structure to move horizontally or rotate.

9. The delivery apparatus according to claim 8, wherein the blocking structure comprises a rod and a rolling portion disposed on the rod, the push slope is in rolling connection with the rolling portion, and the push slope pushes the rolling portion to drive the rod to rotate.

10. The delivery apparatus according to claim 2, wherein the blocking assembly further comprises a reset structure, the reset structure being connected between the base and the blocking structure and configured to provide a driving force for driving the blocking structure to move from the non-blocking position to the blocking position.

11. The delivery apparatus according to claim 1, wherein the docking assembly further comprises a stopping structure disposed on the docking guide rail, the stopping structure being constructed to stop the delivery tool that has been delivered onto the docking guide rail on the docking guide rail.

12. The delivery apparatus according to claim 1, wherein the docking assembly further comprises a sliding rail, and the docking drive structure is constructed to drive the docking guide rail to slide relative to the delivery guide rail along an extension direction of the sliding rail.

13. The delivery apparatus according to claim 1, wherein the delivery assembly and the blocking assembly are both provided in at least two and are in one-to-one correspondence, each delivery guide rail extends along a first direction, all the delivery assemblies are arranged in sequence along a second direction, the docking assembly is provided in two arranged along the first direction on two opposite sides of each delivery assembly, the docking guide rail in each docking assembly reciprocates along the second direction to dock with the delivery guide rail in any one of the delivery assemblies;

wherein a width direction of the delivery guide rail is the second direction intersecting with the first direction.

14. The delivery apparatus according to claim 1, wherein the delivery apparatus further comprises a pedestal, and the delivery assembly, the docking assembly, and the blocking assembly are all in fit connection with the pedestal.

15. An automated assembly line, comprising the delivery apparatus according to claim 1.

* * * * *